United States Patent
Etuke

(10) Patent No.: US 10,831,368 B2
(45) Date of Patent: Nov. 10, 2020

(54) LOCAL STORAGE MEMORY MANAGEMENT FOR A MOBILE DEVICE

(71) Applicant: AT&T Intellectual Property I, L.P., Atlanta, GA (US)

(72) Inventor: Emmanuel O. Etuke, Matawan, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 20 days.

(21) Appl. No.: 15/841,976

(22) Filed: Dec. 14, 2017

(65) Prior Publication Data
US 2019/0187905 A1    Jun. 20, 2019

(51) Int. Cl.
G06F 3/06        (2006.01)
H04L 29/08       (2006.01)
G06F 11/30       (2006.01)

(52) U.S. Cl.
CPC ........ *G06F 3/0605* (2013.01); *G06F 11/3034* (2013.01); *G06F 11/3037* (2013.01); *H04L 67/04* (2013.01); *H04L 67/10* (2013.01); *H04L 67/1097* (2013.01); *H04L 67/125* (2013.01); *G06F 3/0653* (2013.01); *G06F 3/0673* (2013.01)

(58) Field of Classification Search
CPC . G06F 3/0605; G06F 11/3034; H04L 67/1097
See application file for complete search history.

(56) References Cited

U.S. PATENT DOCUMENTS

| | | |
|---|---|---|
| 7,353,350 B2 | 4/2008 | Klassen et al. |
| 7,996,000 B1 | 8/2011 | Dubinko et al. |
| 8,972,525 B1 | 3/2015 | Ramachandran et al. |
| 9,020,890 B2 | 4/2015 | Kottomtharayil et al. |
| 9,060,009 B2 | 6/2015 | Nakrani et al. |
| 9,292,448 B2 | 3/2016 | Daly |
| 9,313,245 B2 | 4/2016 | Mandyam et al. |
| 9,591,075 B2 * | 3/2017 | Blong ............... G06F 3/067 |
| 9,747,030 B2 * | 8/2017 | Morley ............. G06F 3/0604 |
| 2011/0307795 A1 | 12/2011 | Guillou et al. |
| 2015/0373116 A1 * | 12/2015 | Mo ................... G06F 3/0608 709/219 |
| 2016/0259557 A1 | 9/2016 | Yang |
| 2017/0255417 A1 * | 9/2017 | Dain ................. H04L 69/04 |
| 2017/0324633 A1 * | 11/2017 | Lehner .............. H04L 43/16 |
| 2017/0357465 A1 | 12/2017 | Dzeryn et al. |

OTHER PUBLICATIONS

Youtube user "PhoneBuff"; "How to Uninstall an App on Android"; Nov. 2, 2011; Youtube.com; Screenshots extracted from https://www.youtube.com/watch?v=w0gByxlJeLU . (Year: 2011).*

* cited by examiner

*Primary Examiner* — William B Partridge
*Assistant Examiner* — Eric T Loonan

(57) ABSTRACT

In one embodiment, a method for managing a local storage memory for a mobile device includes detecting a level of memory usage of the local storage memory of the mobile device rising above a first threshold. The method determines a respective portion of the level of memory usage of the local storage memory on a per software application basis for a plurality of software applications, and determines a user preference for a memory relief action. The method then implements the memory relief action for at least one software application of the plurality of software applications based on the user preference.

18 Claims, 4 Drawing Sheets

LOCAL STORAGE MEMORY MANAGEMENT FOR A MOBILE DEVICE

The present disclosure relates generally to the management of a local storage memory for a mobile device, and more particularly to devices, non-transitory computer-readable media, and methods for detecting a level of memory usage of the local storage memory of the mobile device rising above a first threshold and then implementing a memory relief action for at least one software application of a plurality of software applications based on a user preference.

BACKGROUND

User endpoint devices, such as mobile devices and smartphones, are ubiquitous. Users utilize software applications on their user endpoint devices for calling, texting, taking photographs, using the internet, and the like. Each of the software applications may store respective data associated with the application, for example call detail records by a phone application, texts by a texting application, photographs by a camera application, internet pages and search history by a web browser application, and the like, to a local storage memory of the user endpoint device. Local storage memory of the user endpoint device may include, for example a flash memory plugged into or built into the user endpoint device. Although memory is inexpensive, it is by no means limitless. Therefore, local storage memory available for use may become depleted over the course of time by the accumulation of stored application data.

As a consequence of the accumulation of stored application data and the continual depletion of local storage memory available for use by these software applications, a user may be prevented from utilizing an application on the user endpoint device or the user endpoint device itself may become unstable, e.g., exhibiting slow operation or inability to perform certain functions such as saving new data. The potential corruption of the local storage memory and a loss of valuable application data, such as a treasured photograph, can be another potential consequence that may occur. Accordingly, in some instances, the user is forced to manually delete application data from the local storage memory in order to be able to utilize an application and store application data associated therewith. For example, the user may be forced to undertake the time consuming process of reviewing and deleting a large number of photographs in order to once again be permitted to take a photograph. In other instances, the user is forced to undertake the expense of troubleshooting for a cause of the instability in an attempt to restore satisfactory operation of the endpoint user device, or attempting a restoration of the valuable application data, which may or may not ultimately be successful.

SUMMARY

In one embodiment, a method for managing a local storage memory for a mobile device includes detecting a level of memory usage of the local storage memory of the mobile device rising above a first threshold. The method determines a respective portion of the level of memory usage of the local storage memory on a per software application basis for a plurality of software applications, and determines a user preference for a memory relief action. The method then implements the memory relief action for at least one software application of the plurality of software applications based on the user preference.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
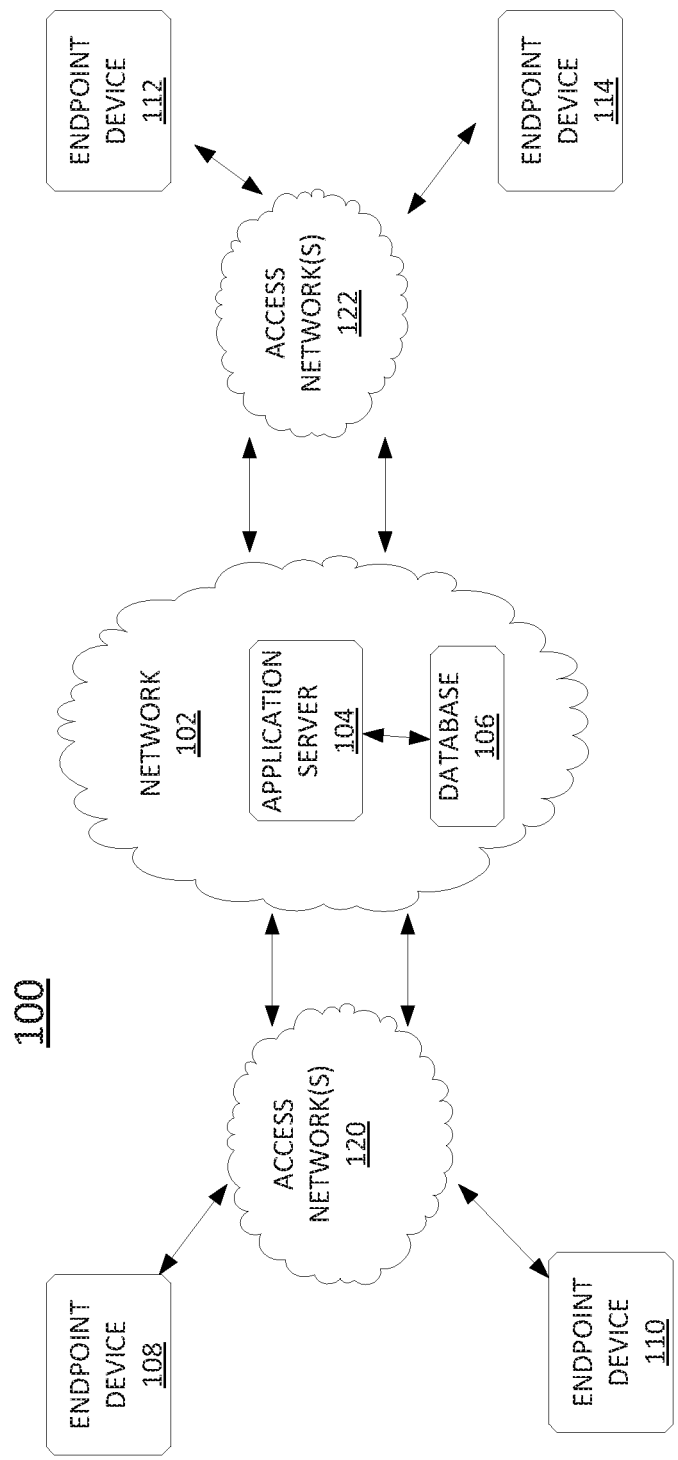
FIG. 1 is a block diagram depicting one example of a communications network.

Local storage memory available for use by software applications installed on a user endpoint device may become depleted over the course of time. Inadequate management of memory utilization of the local storage memory in a user endpoint device, e.g., a mobile device, can result in problems, including operational instability of the user endpoint device. The instability can manifest in poor performance of the software applications, e.g., loss of certain saving functions, crashes of software applications installed on the user endpoint device, and/or an outright corruption or loss of the application data, which may be difficult or costly to recover. These problems can result in user dissatisfaction, and consequential user complaints to the software application developers and even to the mobile service provider where additional time and money are spent to troubleshoot and remediate the user endpoint device problems. Inadequate management of memory utilization of the local storage memory in a user endpoint device also may result in the user being prevented from utilizing an application on the user endpoint device, e.g., prohibiting a user to take an important picture during a real time event and the like. In order to be able to utilize the software application, the user is forced to manually delete application data from the local storage memory. For example, the user may be forced to undertake the time consuming process of manually reviewing and deleting a number of photographs and/or videos in order to once again be permitted to take a photograph or video. By the time the user is able to regain the camera function, the moment for taking a picture may have already passed, thereby leading to user frustration. Current user endpoint devices do not offer a user memory management whereby the user endpoint device automatically purges old application data to free up the necessary memory.

Accordingly, in one embodiment, the present disclosure is a method, user endpoint device, or non-transitory computer-readable medium for managing a local storage memory, e.g., of a mobile user endpoint device. Embodiments of the disclosure monitor the memory usage of a local storage memory of a user endpoint device and detect when a level of memory usage of the local storage memory rises above a first threshold. A respective portion of the level of memory usage of the local storage memory is determined on a per software application basis for a plurality of software applications. A user preference for a memory relief action is determined. When the level of memory usage of the local storage memory rises above the first threshold, a memory relief action is implemented for at least a first software application of the plurality of software applications based on the user preference.

In one embodiment, a software agent is deployed in the user endpoint device to actively monitor the memory utilization of the local storage memory of the user endpoint device. Local storage memory available for storage falling below a preset threshold may serve as a trigger for the software agent to automatically delete certain pre-specified application data (such as photos, videos, text files, PDF files and so on) in order to free up the local storage memory to a level where the user endpoint device can continue to operate normally.

In one embodiment, the operating system of the user endpoint device mandates applications to be developed with application programming interfaces (APIs) that support occasional deletion of application data. A software agent running at the root level of the user endpoint device will then monitor the memory resource utilization of the local storage memory of the user endpoint device. When the local storage memory available for storage falls below a configurable low watermark (broadly a first threshold), the software agent will poll for memory utilization for each software application installed in the user endpoint device, and delete certain application data until the available capacity of the local storage memory for storage increases to a high watermark (broadly a second threshold). The software agent can use API calls to query and profile the installed software applications. The application profile may include a listing of expendable user files (or simply types or categories of user files) of application data along with the dates that they were last modified. In one embodiment, the deletion of files of application data is performed according to a user preference. In one embodiment, files of application data that are specifically tagged as favorites can be excluded from being purged in such deletion. In one embodiment, the software agent may also archive the application data in a cloud location before deleting the application data from the local storage memory. Namely, any application data that is targeted for deletion is first backup into a cloud storage location prior to actual deletion from the local storage memory of the user endpoint device.

FIG. 1 is a block diagram depicting one example of a communications network 100. The communications network 100 may be any type of communications network, such as for example, a traditional circuit switched network (CS) (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, 5G and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. The core network 102 may be in communication with one or more access networks 120 and 122. The access networks 120 and 122 may include a wireless access network (e.g., a WiFi network and the like), a cellular access network, a PSTN access network, a cable access network, a wired access network and the like. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one embodiment, the core network 102 may include an application server (AS) 104 and a database (DB) 106. Although only a single AS 104 and a single DB 106 are illustrated for clarity reasons, it should be noted that any number of application servers 104 or databases 106 may be deployed in a distributed network.

In one embodiment, the DB 106 may store data relating to calls originating and/or terminating in the network 100. This data may be detected by network counters and stored in the DB 106, where the AS 104 may access the data for further use. For example, the DB 106 may store data relating to the number of calls originating and/or terminating in the network, the number of these calls that were deemed successful, and the number of these calls that failed. Furthermore, in another embodiment, the data stored in the DB 106 may comprise the number and type of software applications that are installed in each user endpoint device for each subscribers, e.g., each user endpoint device may be a smart phone having a plurality of installed software applications. The subscribers may opt-in with the mobile service operators for a tracking service that tracks the number and type of software applications that are installed in each user endpoint device for the benefit of the subscribers for data backup purposes. In one embodiment, the DB 106 (or a distributed network of DBs and/or application servers, not shown) can serve as a cloud backup location for application data targeted for deletion based on a memory management service as discussed herein. Namely, in one example any application data that is deleted from a user endpoint device can be temporarily stored in DB 106 and a notification is sent to the subscriber to have an opportunity to retrieve any deleted application data.

In one embodiment, the access network 120 may be in communication with one or more user endpoint devices (also referred to generally as "endpoint devices" or "UE") 108 and 110. In one embodiment, the access network 122 may be in communication with one or more user endpoint devices 112 and 114.

In one embodiment, the user endpoint devices 108, 110, 112 and 114 may be any type of endpoint device such as a mobile endpoint device such as a cellular telephone, a smart phone, a tablet computer, a laptop computer, a netbook, an ultrabook, a tablet computer, a portable media device (e.g., an MP3 player), a portable gaming device, a pair of smart glasses, and the like. It should be noted that although only four user endpoint devices are illustrated in FIG. 1, any number of user endpoint devices may be deployed.

Figure 2:
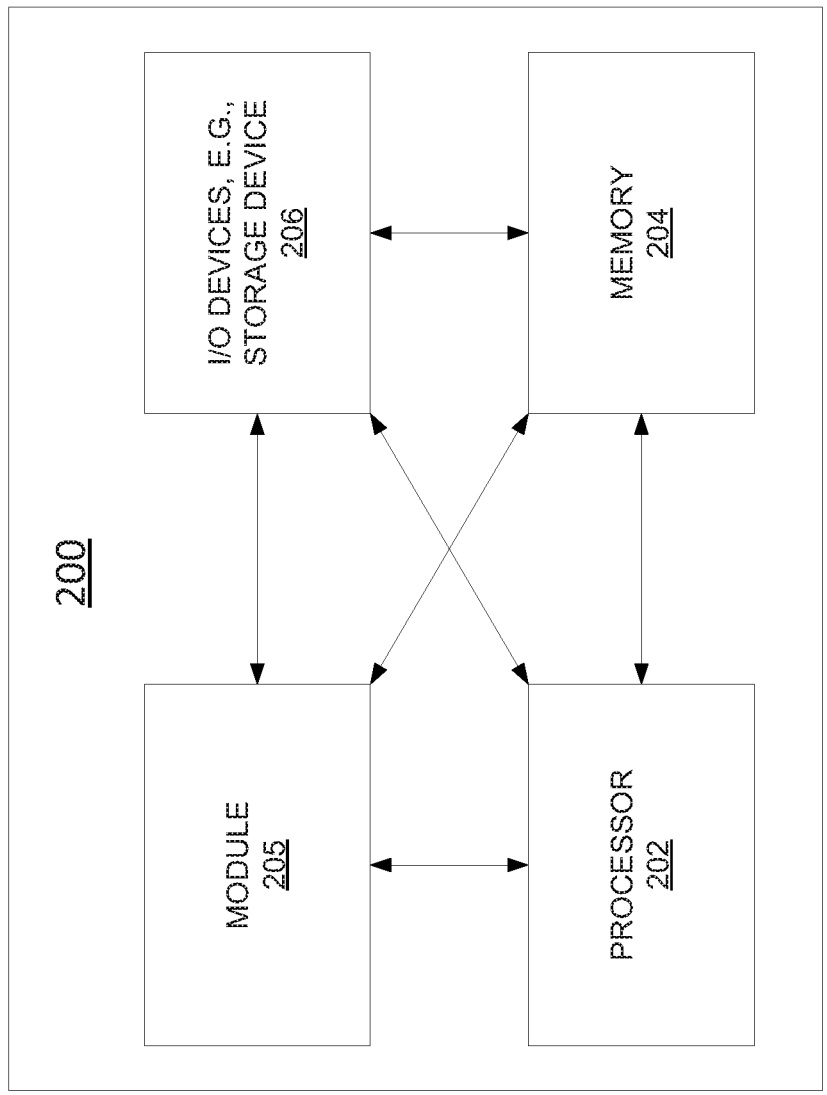
FIG. 2 is a high level block diagram of a dedicated computing device suitable for implementing the methods of the disclosure.

In one embodiment, each of the user endpoint devices 108, 110, 112 and 114 may comprise a general purpose computer as illustrated in FIG. 2 and discussed below. In one embodiment, a user endpoint device may perform the methods and algorithms discussed below related to local storage memory management.

It should be noted that the network 100 has been simplified for clarity purposes. For example, the network 100 may include other network elements (not shown) such as border elements, routers, switches, policy servers, security devices, a content distribution network (CDN) and the like.

FIG. 2 depicts an example high-level block diagram of a dedicated computing device suitable for use in performing the functions described herein. As depicted in FIG. 2, the system 200 comprises one or more hardware processor elements 202 (e.g., a central processing unit (CPU), a microprocessor, or a multi-core processor), a local memory 204, e.g., volatile memory such as random access memory (RAM), a module 205 for managing the local storage memory (e.g., implemented as a software agent), and various input/output devices 206 (e.g., storage memory devices, including but not limited to nonvolatile memories such as: a flash memory device, a flash drive or a Universal Serial Bus (USB) memory drive, and the like). Various input/output devices 206 may also include a receiver, a transmitter, a speaker, a display, a speech synthesizer, an output port, an input port and a user input device (such as a keyboard, a keypad, a mouse, a microphone and the like). The system may also include a read only memory (ROM) (not shown) interconnected with the hardware processor elements 202, the local memory 204, the module 205 for managing the local storage memory, and the various input/output devices 206. Although only one processor element is shown, it should be noted that the general-purpose computer may employ a plurality of processor elements. Furthermore, although only one computing device is shown in the figure, if the method(s) as discussed below is implemented in a distributed or parallel manner for a particular illustrative example, i.e., the steps of the below method(s) or the entire method(s) are implemented across multiple or parallel computing devices, then the computing device of this figure is intended to represent each of those multiple computing devices. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a dedicated computing device or any other hardware equivalents, e.g., computer readable instructions pertaining to the method(s) discussed below can be used to configure a hardware processor to perform the steps, functions and/or operations of the below disclosed methods. In one embodiment, instructions and data for the present module or process 205 for managing local storage memory (e.g., a software program comprising computer-executable instructions) can be loaded into local memory 204 and executed by hardware processor element 202 to implement the steps, functions or operations as discussed below in connection with the exemplary method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the below described method(s) can be perceived as a programmed processor or a specialized processor. As such, the present module 205 for managing local storage memory (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

Figure 3:
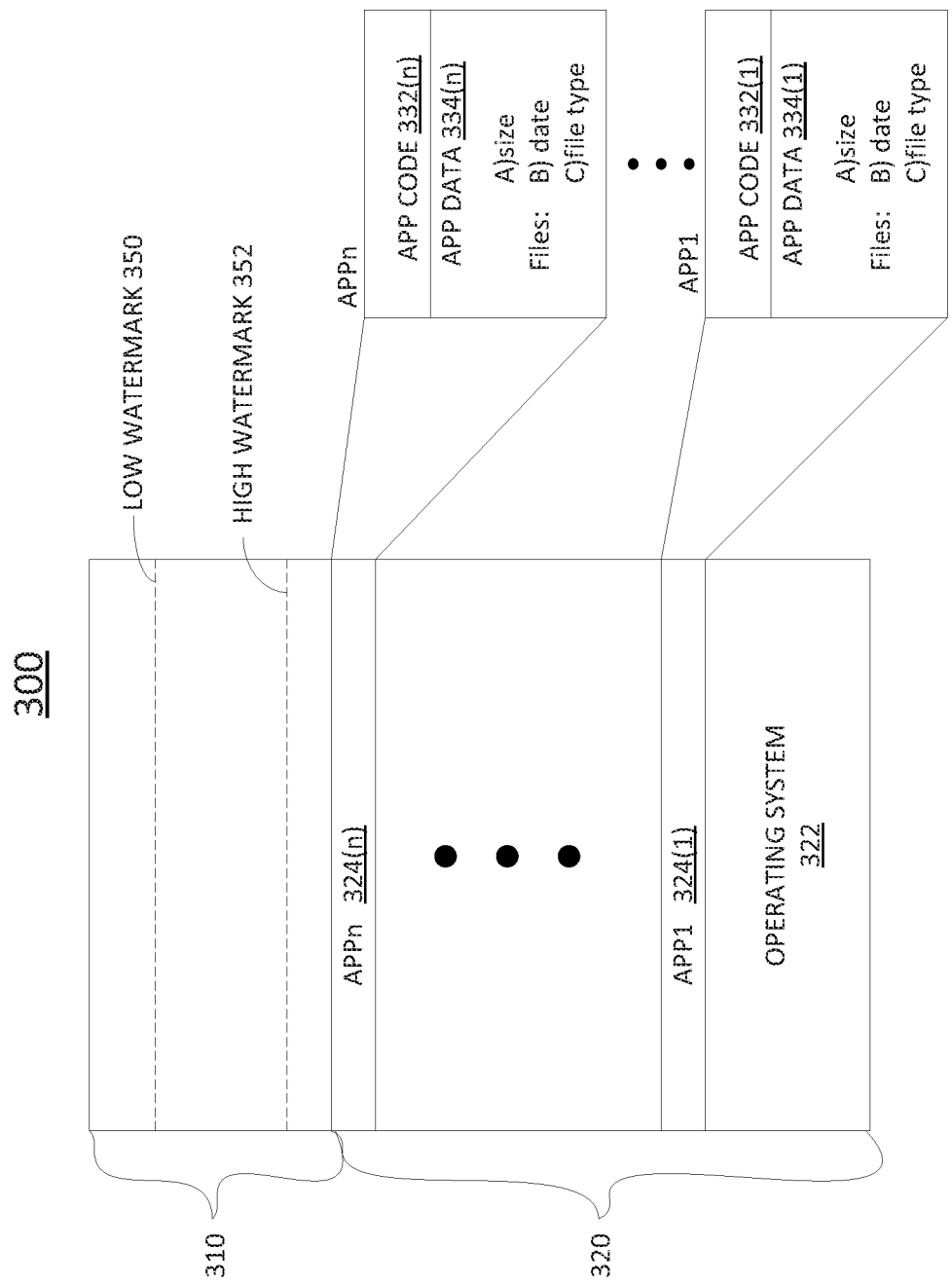
FIG. 3 is a block diagram depicting an example of the local storage memory portion of the apparatus of FIG. 2 in greater detail and according to the disclosure.

FIG. 3 is an example block diagram depicting an example of the local storage memory portion of the apparatus of FIG. 2 in greater detail. Local storage memory of the user endpoint device includes, for example a flash memory plugged into or built into the user endpoint device. Although local storage memory is inexpensive, it is by no means limitless. Therefore, according to the present disclosure, local storage memory is managed in order to prevent its depletion over the course of time due to the accumulation of stored application data.

In one illustrative example, local storage memory 300 includes a first portion 310 that currently has available capacity for storing additional data or new software applications and a second portion 320 that is currently fully being used for storing a plurality of software applications (e.g., application #1 324(1) through application # n 324(n)) and their respective application data including a portion of the local storage memory being utilized by the operating system 322.

The plurality of applications can include two or more of a phone application for making telephone calls, a texting application for texting, a camera application for taking photographs and/or videos, a web browser application for accessing the internet, a navigation application, a shopping application, a gaming application, an email application, and the like. This short list of possible software applications installed in the local storage memory is only illustrative and should not be deemed as a limitation of the present disclosure. Each of the respective applications utilizes the local storage memory for storage of application code 332(n) and application data 334(n). To illustrate, application code 332(n) is the software for executing a respective application such as, for example, the software for implementing a camera application. Application data 334(n) is the data generated during the use of a respective application and stored by the respective application. For example, application data 334(n) may comprise one of: call detail records captured by a phone application, texts sent or received by a texting application, photographs and/or videos taken by a camera application, internet pages and search history reviewed by a web browser application, and the like. Application data 334(n) may include a number of files, and each file may be specified by at least one of: a size, a date, file-type and so on. In fact, one of the applications 324(n) in the local storage memory can be designated for the application code and application data for implementing the method of managing local storage memory according to the present disclosure.

In one example, the first portion 310 of the local storage memory 300 still contains available memory capacity for storing application data for use by any of the software applications 324(1) through 324(n). A "low watermark" or broadly a first threshold 350 and a "high watermark" or broadly a second threshold 352 are depicted in FIG. 3 and indicate different levels of the local storage memory depletion. For example, the "low watermark" or first threshold 350 indicates a level of memory usage of the local storage memory beyond which the user may potentially not be permitted to utilize certain software applications or some functions of the software applications of the user endpoint device or the user may experience software application instability, e.g., application crashes or delays on the user endpoint device. The "high watermark" or second threshold 352 indicates a level of memory usage of the local storage memory to which memory usage of the local storage memory of the user endpoint device is to be reduce after a memory relief action is implemented. The first threshold and second threshold may be set to a standard value (i.e., default value) (e.g., between eighty-five to ninety percent (85%-90%) for the low watermark 350 and seventy to eighty percent (70%-80%) for the high watermark 352. Alternatively, the first threshold and second threshold may be dynamically established by performing local statistical analysis based on observed or reported instances of system or software crashes at the user endpoint device or an inability to utilize a feature or function of a particular application (e.g., inability to attach a file to an email using an email application, inability to take additional pictures or videos using a camera application, inability to watch a streamed program via a media presentation application, inability to download a file via a download application, and so on). The present disclosure will now be described in greater details in view of a flowchart.

Figure 4:
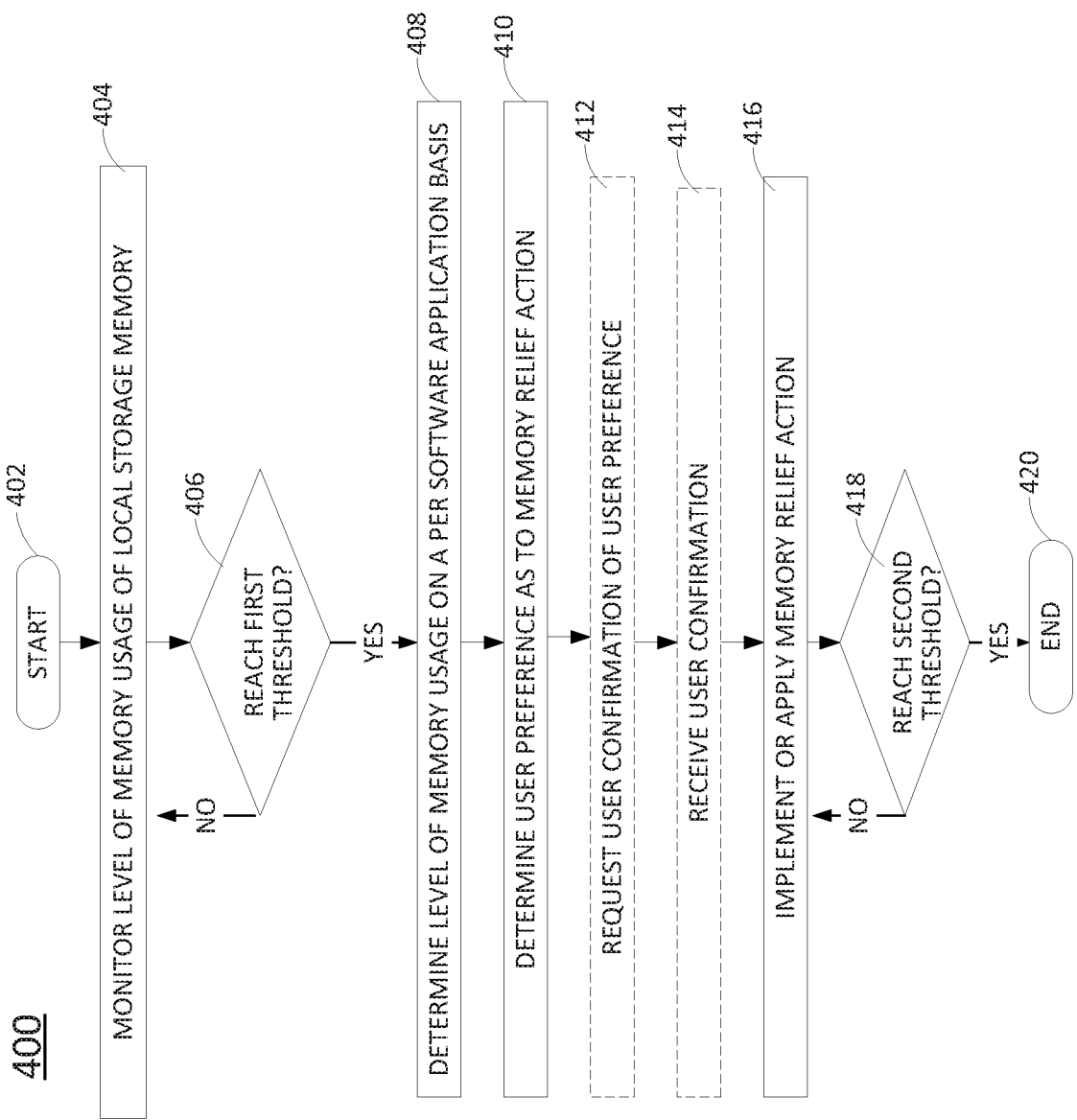
FIG. 4 illustrates an example flowchart of a method for local storage memory management according to the disclosure.

FIG. 4 illustrates an example flowchart of a method 400 for providing local storage memory management. In particular, in one embodiment, the method 400 manages the local storage memory of a user endpoint device, e.g., a mobile endpoint device. In one embodiment, the method 400 may be performed by a user endpoint device 112 or a dedicated computing device as illustrated in FIG. 2 and discussed above.

The method 400 begins in step 402. In step 404, the method monitors the level of memory usage of the local storage memory of the user endpoint device. For example, the local storage memory is utilized for storage of application code 332(n) and application data 334(n) for a number of applications 324(n). Software applications may include a phone application for making telephone calls, a texting application for texting, a camera application for taking photographs and/or videos, a web browser application for accessing the internet, a navigation application for providing driving instructions, an email application, a media presentation application, and the like. Application code 332(n) is the software for executing a respective application such as, for example, the software for implementing a camera application. Application data 334(n) is data generated during the use of a respective application and stored by the respective application. For example, application data 334(n) may comprise one of: call detail records captured by a phone application, texts sent or received by a texting application, photographs and/or videos taken by a camera application, internet pages and search history reviewed by a web browser application, document files from a word processing application, and the like. Thus the local storage memory may be occupied by stored text messages, photographs, videos, emails, email attachments, text files, and the like associated with respective software applications. Application data 334(n) may include a number of files, and each file may be specified by at least one of: a size, a date, a file-type, an associated application type, and so on. One of the applications 324(n) in the local storage memory is designated for the application code and application data for implementing the current method of managing local storage memory according to the present disclosure.

In step 406, the method determines whether a "low watermark" or first threshold is reached by a level of memory usage of the local storage memory of the user endpoint device. The "low watermark" or first threshold indicates a level of local storage memory depletion. The "low watermark" or first threshold indicates a level of memory usage of the local storage memory beyond which the user may not be permitted to utilize certain applications or certain features or functions of the software applications of the user endpoint device or may experience software application instability on the user endpoint device. When the "low watermark" or first threshold is not reached by the level of memory usage of the local storage memory of the device, the method returns to step 404 and continues to monitor the level of memory usage of the local storage memory of the user endpoint device. When the "low watermark" or first threshold is reached in the local storage memory of the device, the method continues to step 408.

In step 408, in one embodiment the method determines a respective portion of the level of memory usage of the local storage memory on a per software application basis for a plurality of software applications. For example, the method may determine that an installed camera application is using seventy-percent (70%) of the local storage memory and an installed texting application is using ten percent (10%) of the local storage memory, with ten percent (10%) of the memory being used by the operating system and other software agents, and the remaining ten percent (10%) being available for use. Alternatively, in another embodiment, the threshold for the low watermark need not be computed on a software application basis. For example, the threshold for the low watermark could also be set to the aggregate memory utilization of all user software applications, e.g., where the low watermark is based on an aggregate memory utilization reaching, say 90% and so on.

In step 410, the method determines a user preference as to a particular memory relief action. That is; the method determines the user's preference as to which application data of the plurality of applications is to be acted upon by a memory relief action. The user preference may be based on a user preference based on age of the application data, a user preference based on an application-type of the application data, a user preference based on a file-size of the application data, a user preference based on a file-type of the application data, or a user preference that is user-defined. For example, using the user preference that is user-defined, a user may define that a particular file(s) is not be touch by a memory relief action. For example, the user may define that certain photographs are not to be acted upon by a memory relief action, e.g., certain specifically tagged photographs, certain photographs associated with a location, a period of time, containing certain types of content, e.g., images of friends and relatives, and so on. In another example, the user may desire to act upon application data in an age order, with the oldest application data being the first upon which to apply the memory relief action. In one embodiment, a priority order for the user preference is specified. For example, a user may prefer to take memory relief action first according to the user preference based on file size, and then based upon the file-type of the application data, and so on. Alternatively, in another embodiment, the memory relief action may delete application data in proportion to the percentage of memory utilized by the respective application data, until a high watermark is reached. This memory relief action being based on aggregate memory utilization is agnostic to installing and removing of user applications.

In optional step 412, the method requests a user input confirming the user preference. The request may be provided to the user via the input/output device, e.g., a screen, of the user endpoint device. For example, a visual message or a verbal message may be presented on a screen or a speaker of the mobile endpoint device indicating that 100 photographs will now be deleted and/or moved to a cloud storage location. This alert will allow the user to be informed of the pending memory relief action that will be taking place.

In optional step 414, the method checks whether user confirmation as to the user preference for memory relief action has been received. For example, user input (textual or verbal) may be received via the input/output device, e.g., a key pad, a touch screen, or a speaker, of the user endpoint device. For example, the user may enter an affirmative response to proceed with the deletion of the 100 oldest photographs from the local storage memory.

In one example, if the user input confirming the user preference for the memory relief action is not received, the method continues to wait for the user input at step 414. When the user input confirming the user preference is received, the method continues to step 416.

In step 416, the method implements or applies the memory relief action to one or more of the plurality of software applications based on the user preference. In one embodiment, implementing the memory relief action comprises deleting a portion of an application data in the local storage memory of the device for one or more of the plurality of software applications. For example, a photograph may be deleted from the application data associated with a camera application according to a user preference that application data associated with a camera application be deleted before other application data. Once the pertinent photographs are deleted, older emails from email applications can in turn be deleted, older downloaded movies can in turn be deleted from a media presentation application and so on.

In one embodiment, implementing the memory relief action further comprises uploading the deleted application data to a cloud based memory via a communications network prior to the deleting. For example, a photograph may be uploaded to a cloud based memory and then deleted from the application data associated with a camera application on the mobile endpoint device.

In one embodiment, implementing the memory relief action comprises implementing the memory relief action based on at least one of: an age of the application data, an application-type of the application data, a file-size of the application data, or a file-type of the application data (e.g., xls, pdf, doc, etc.). For example, application data may preferable be deleted when its creation date or last modified data is prior to a particular date. For instance, photographs may preferable be deleted from the application data associated with a camera application before application data associated with other applications is deleted. For example, spreadsheet files with an xls extension may be deleted before application data associated with other applications is deleted. In one embodiment, implementing the memory relief action comprises implementing the memory relief action in accordance with a user preference that is user-defined. For example, particular photographs for a particular date (e.g., a wedding day) may be designated as "do not delete," irrespective as to its age.

At step 418, the method checks whether the implementation of the memory relief action has altered the level of memory usage of the local storage memory of the user endpoint device reaching a "high watermark" or second threshold. When the implementation or application of the memory relief action does not result in the level of memory usage of the local storage memory of the user endpoint device reaching a "high watermark" or second threshold, the method continues to step 416 to continue the implementation of the memory relief action according to the user preference, e.g., deleting more photographs or deleting application data from a secondary software application, a tertiary software application and so on. Thus, the memory relief action may continue to be applied until the level of memory usage of the local storage memory falls below the second threshold. For example, application data in the local storage memory of the mobile endpoint device may be deleted for at least a first software application of the plurality of software applications until the level of memory usage of the local storage memory falls below a second threshold. For example, assume a "high watermark" or second threshold of seventy-percent (70%) of memory usage of the local storage memory and a user preference to take relief action on a camera application. Given the above example of an installed camera application using seventy-percent (70%) of the local storage memory, an installed texting application using ten percent (10%) of the local storage memory, the operating system and other software agents using ten percent (10%) of the local storage memory, and the remaining ten percent (10%) being available for use, the applied memory relief action will be applied to the installed camera application until it reaches fifty-percent (50%) of usage of the local storage memory. In that case, the level of memory usage of the local storage memory is set to seventy-percent (70%), comprising fifty-percent (50%) of the local storage memory for the camera application, ten percent (10%) of the local storage memory for the texting application, and ten percent (10%) of the local storage memory for the operating system and other software agents. The available memory falling below a preset threshold serves as a trigger for the monitoring agent to automatically delete the pertinent user-specified application data (such as photos and videos) to free up sufficient memory to a level where the user endpoint device can operate normally.

When the implementation or application of the memory relief action results in the level of memory usage of the local storage memory of the user endpoint device reaching a "high watermark" or second threshold, the method continues to step 420. In step 420, the method 400 ends.

Thus, according to the provided method for managing local storage memory for a device, memory resource utilization of the local storage memory of the device is monitored, and, in response to the available memory of the local storage memory falling below a first threshold, application user data in the local storage memory is automatically deleted until the available memory increases to a second threshold.

In addition, although not expressly specified above, one or more steps of the method 400 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 4 that recite a determining operation or involve a decision do not necessarily require that both branches of the determining operation be practiced. In other words, one of the branches of the determining operation can be deemed as an optional step. Furthermore, operations, steps or blocks of the above described method(s) can be omitted, combined, separated, and/or performed in a different order from that described above, without departing from the example embodiments of the present disclosure. For instance, any one or more steps of the above recited methods may comprise optional steps in various additional examples.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for managing a local storage memory for a mobile device, the method comprising:
   detecting, by a processor of the mobile device, a level of memory usage of the local storage memory of the mobile device rising above a first threshold, wherein the first threshold is dynamically established via local statistical analysis based on at least one of:
      observed instances of system crashes at the mobile device; or
      observed instances of software application crashes at the mobile device;
   determining, by the processor, a respective portion of the level of memory usage of the local storage memory on a per software application basis for a plurality of software applications;
   determining, by the processor, a user preference for a memory relief action; and
   implementing, by the processor, the memory relief action for at least one software application of the plurality of software applications based on the user preference, wherein the implementing the memory relief action comprises deleting a portion of an application data in the local storage memory of the mobile device for the at least one software application of the plurality of software applications until the level of memory usage of the local storage memory falls below a second threshold, wherein the second threshold is dynamically established via local statistical analysis based on at least one selected from a group of: the observed instances of system crashes at the mobile device and the observed instances of software application crashes at the mobile device.

2. The method of claim 1, wherein the implementing the memory relief action further comprises:
   uploading the portion of the application data to a cloud based memory via a communications network prior to the deleting.

3. The method of claim 1, wherein the user preference specifies at least one of: an age of the portion of the application data, an application-type of the portion of the application data, a file-size of the portion of the application data, a file-type of the portion of the application data, or a preference that is user-defined.

4. The method of claim 3, wherein a priority order for the user preference is specified by a user.

5. The method of claim 1, wherein the portion of the application data comprises at least one of: a text message, a photograph, a video, an email, an email attachment, a stored web page, or a movie.

6. The method of claim 1, further comprising, prior to the implementing:
   requesting, by the processor, a user input confirming the user preference; and
   receiving, by the processor, the user input confirming the user preference.

7. A mobile device comprising:
   a local storage memory;
   a processor; and
   a computer-readable storage device storing a plurality of instructions which, when executed by the processor, cause the processor to perform operations, the operations comprising:
      detecting a level of memory usage of the local storage memory of the mobile device rising above a first threshold, wherein the first threshold is dynamically established via local statistical analysis based on at least one of:
         observed instances of system crashes at the mobile device; or
         observed instances of software application crashes at the mobile device;
      determining a respective portion of the level of memory usage of the local storage memory on a per software application basis for a plurality of software applications;
      determining a user preference for a memory relief action; and
      implementing the memory relief action for at least one software application of the plurality of software applications based on the user preference, wherein the implementing the memory relief action comprises deleting a portion of an application data in the local storage memory of the mobile device for the at least one software application of the plurality of software applications until the level of memory usage of the local storage memory falls below a second threshold, wherein the second threshold is dynamically established via local statistical analysis based on at least one selected from a group of: the observed instances of system crashes at the mobile device and the observed instances of software application crashes at the mobile device.

8. The mobile device of claim 7, wherein the implementing the memory relief action further comprises:
   uploading the portion of the application data to a cloud based memory via a communications network prior to the deleting.

9. The mobile device of claim 7, wherein the user preference specifies at least one of: an age of the portion of the application data, an application-type of the portion of the application data, a file-size of the portion of the application data, a file-type of the portion of the application data, or a preference that is user-defined.

10. The mobile device of claim 9, wherein a priority order for the user preference is specified by a user.

11. The mobile device of claim 7, wherein the portion of the application data comprises at least one of: a text message, a photograph, a video, an email, an email attachment, a stored web page, or a movie.

12. The mobile device of claim 7, further comprising, prior to the implementing:
   requesting a user input confirming the user preference; and
   receiving, by the processor, the user input confirming the user preference.

13. A non-transitory computer-readable storage device storing a plurality of instructions which, when executed by a processor of a mobile device, cause the processor to perform operations for managing a local storage memory of the mobile device, the operations comprising:
   detecting a level of memory usage of the local storage memory of the mobile device rising above a first threshold, wherein the first threshold is dynamically established via local statistical analysis based on at least one of:
- observed instances of system crashes at the mobile device; or
- observed instances of software application crashes at the mobile device;

determining a respective portion of the level of memory usage of the local storage memory on a per software application basis for a plurality of software applications;

determining a user preference for a memory relief action; and implementing the memory relief action for at least one software application of the plurality of software applications based on the user preference, wherein the implementing the memory relief action comprises deleting a portion of an application data in the local storage memory of the mobile device for the at least one software application of the plurality of software applications until the level of memory usage of the local storage memory falls below a second threshold, wherein the second threshold is dynamically established via local statistical analysis based on at least one selected from a group of: the observed instances of system crashes at the mobile device and the observed instances of software application crashes at the mobile device.

14. The non-transitory computer-readable storage device of claim 13, wherein the implementing the memory relief action further comprises:
uploading the portion of the application data to a cloud based memory via a communications network prior to the deleting.

15. The non-transitory computer-readable storage device of claim 13, wherein the user preference specifies at least one of: an age of the portion of the application data, an application-type of the portion of the application data, a file-size of the portion of the application data, a file-type of the portion of the application data, or a preference that is user-defined.

16. The non-transitory computer-readable storage device of claim 15, wherein a priority order for the user preference is specified by a user.

17. The non-transitory computer-readable storage device of claim 13, wherein the portion of the application data comprises at least one of: a text message, a photograph, a video, an email, an email attachment, a stored web page, or a movie.

18. The non-transitory computer-readable storage device of claim 13, further comprising, prior to the implementing:
requesting a user input confirming the user preference; and
receiving the user input confirming the user preference.

* * * * *